(12) United States Patent (10) Patent No.: US 8,443,343 B2
Blomstedt et al. (45) Date of Patent: May 14, 2013

(54) CONTEXT-SENSITIVE SLICING FOR DYNAMICALLY PARALLELIZING BINARY PROGRAMS

(75) Inventors: Joseph Blomstedt, Boulder, CO (US); Cheng Wang, San Jose, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 708 days.

(21) Appl. No.: 12/607,589

(22) Filed: Oct. 28, 2009

(65) Prior Publication Data

US 2011/0099541 A1 Apr. 28, 2011

(51) Int. Cl.
*G06F 9/45* (2006.01)

(52) U.S. Cl.
USPC .......................................................... 717/136

(58) Field of Classification Search .................... 717/136
See application file for complete search history.

(56) References Cited

U.S. PATENT DOCUMENTS

| | | | | |
|---|---|---|---|---|
| 5,161,216 | A * | 11/1992 | Reps et al. ..................... | 717/151 |
| 6,125,375 | A * | 9/2000 | Atkins et al. .................. | 715/207 |
| 7,620,946 | B2 * | 11/2009 | Russell .......................... | 717/157 |
| 2005/0204344 | A1 * | 9/2005 | Shinomi ........................ | 717/124 |
| 2006/0123401 | A1 | 6/2006 | O'Brien et al. | |
| 2007/0162903 | A1 | 7/2007 | Babb, II et al. | |
| 2008/0196012 | A1 * | 8/2008 | Cohen et al. .................. | 717/125 |

OTHER PUBLICATIONS

Kiss, Akos et al. 2003. Interprocedural Static Slicing of Binary Executables. Proceedings of the Third IEEE International Workshop on Source Code Analysis and Manipulation (SCAM'03) 0-7695-2005-7/03 ™ 2003 IEEE.*

Binkley, D., Gold, N., and Harman, M. 2007. An empirical study of static program slice size. ACM Trans. Softw. Eng.Methodol. 16, 2, Article 8 (Apr. 2007), 32 pages. DOI = 10.1145/1217295.1217297 http://doi.acm.org/10.1145/1217295.1217297.*

Krinke, Jens et al. 2002. Evaluating Context-Sensitive Slicing and Chopping. ™ 2002 IEEE. Published in the Proceedings International Conference on Software Maintenance, 2002 in Montreal, Canada.*

Kim, Dongkeun et al. 2001. Using Program Slicing to Drive Pre-Execution on Simultaneous Multithreading Processors. University of Maryland Inistitute for Advanced Computer Studies UMIACS-TR-2001-49.*

(Continued)

*Primary Examiner* — Henry Tsai
*Assistant Examiner* — Eric Oberly
(74) *Attorney, Agent, or Firm* — Trop, Pruner & Hu, P.C.

(57) ABSTRACT

In one embodiment of the invention a method comprising (1) receiving an unstructured binary code region that is single-threaded; (2) determining a slice criterion for the region; (3) determining a call edge, a return edge, and a fallthrough pseudo-edge for the region based on analysis of the region at a binary level; and (4) determining a context-sensitive slice based on the call edge, the return edge, the fallthrough pseudo-edge, and the slice criterion. Embodiments of the invention may include a program analysis technique that can be used to provide context-sensitive slicing of binary programs for slicing hot regions identified at runtime, with few underlying assumptions about the program from which the binary is derived. Also, in an embodiment a slicing method may include determining a context-insensitive slice, when a time limit is met, by determining the context-insensitive slice while treating call edges as a normal control flow edges.

19 Claims, 5 Drawing Sheets

OTHER PUBLICATIONS

Kamkar, Mariam et al. 1992. Interprocedural dynamic slicing. Programming Language Implementation and Logic Programming Lecture Notes in Computer Science, 1992, vol. 631/1992, 370-384, DOI 10.1007/3-540-55844-6__148.*

International Searching Authority, Notification of Transmittal of the International Search Report and the Written Opinion of the International Searching Authority, or the Declaration, mailed May 2, 2011 in International application No. PCT/US2010/046685.

Zingbo Zhang, et al., "Parameter and Return-value Analysis of Binary Executables," Jul. 30, 2007, pp. 501-506.

Akos Kiss, et al., "Using Dynamic Information in the Interprocedural Static Slicing of Binary Executables," Software Quality Journal, Dec. 2005, vol. 13, No. 3, Dec. 31, 2005, pp. 227-245.

U.S. Appl. No. 12/139,647, filed Jun. 16, 2008, entitled "Optimal Code Replication for Improving Parallelism in Single-Threaded Programs," by Cheng Wang, et al.

Donglin Liang, et al., "Reuse-Driven Interprocedural Slicing in the Presence of Pointers and Recursion," 1999, pp. 1-10.

Mary Jean Harrold, et al., "Reuse-Drive Interprocedural Slicing," 1998, pp. 1-10.

Saurabh Sinha, et al., "System-Dependence-Graph-Based Slicing of Programs with Arbitrary Interprocedural Control Flow," 1999, pp. 1-10.

Susan Horwitz, et al., "Interprocedural Slicing Using Dependence Graphs," Jan. 1990, pp. 1-35.

Chi-Keung Luk, et al., "Pin: Building Customized Program Analysis Tools with Dynamic Instrumentation," Apr. 19, 2005, pp. 1-11.

Cheng Wang, et al., "StarDBT: An Efficient Multi-platform Dynamic Binary Translation System," 2007, pp. 1-12.

Hiralal Agrawal, et al., "Dynamic Program Slicing," 1990, pp. 1-11.

David Binkley, "An Empirical Study of Static Program Slice Size," 2007, 1 page.

Patent Cooperation Treaty, "Notification of Transmittal of International Search Report and Written Opinion of the International Searching Authority," in international application No. PCT/US2010/046685, mailed May 2, 2011.

Kiss, Akos, et al., "Using Dynamic Information in the Interprocedural Static Slicing of Binary Executables," Dec. 2005, pp. 227-245.

Zhang, Jingo, et al., "Parameter and Return-value Analysis of Binary Executables," Jul. 2007, pp. 501-506.

* cited by examiner

Function sliceBackwards*(inst, vals, start)*
       inst    :An instruction to start slicing from
       vals    :A set of criterion values
       start   :A boolean indicating if this call is the start of the slice
1. (flowIn, calls) ← Subslice(inst, vals, start);
2. foreach (callsite, target) ∈ calls do
3.    callIn ← flowIn [target];
4.    sliceBackwards(callsite, callIn, false);

Function Subslice*(inst, vals, start)*
       inst    :An instruction to start slicing from
       vals    :A set of criterion values
       start   :A boolean indicating if this call is the start of the slice
1 flowIn[inst] ← vals;
2 calls ← {};
3 if start *is false* then
4    flowIn[inst] ← flowIn[inst] – use[inst];
5    if flowIn[inst] changed then
6       slice ← slice ∪ {inst};
7 worklist ← pred[inst];
8 while worklist *not empty* do
9    remove (node, edgeType, nodeSucc) from worklist;
10    *oldIn* ← f lowIn[node];
11    foreach (succ, succType) ∈ succ[node] do
12       if succType is not a call or return then
13          flowout ← flowout ∪ flowIn[succ];
14    switch edgeType do
15       case *call*
16          calls ← ∪ {(node, nodeSucc)};
17          continue;
18       case *return*
19          (*downFlow, downCalls*) ← Subslice(node, flowIn[nodeSucc], *false*);
20          downFlowList ← downFlowList + *downFlow*;
21          worklist ← (preceding[nodeSucc], *puesdoEdge*) + worklist;
22       case *puesdoEdge*
23          foreach downIn ∈ downFlowList do
24             foreach (succ, succType) ∈ succ[node] do
25                if succType is a call then
26                   flowOut ← flowOut ∪ downIn[succ];
27    flowIn[node] ← flowOut;
28    if (flowOut ∩ def[node]) ≠ {} then
29       slice ← slice ∪ {node};
30    flowIn[node] ← (flowIn[node]-def[node]) ∪ use[node];
31    if flowIn[node] ≠ oldIn then
32       worklist ← worklist + pred[node] + controlDep[node];
33 return (flowIn, calls);

FIG. 4

CONTEXT-SENSITIVE SLICING FOR DYNAMICALLY PARALLELIZING BINARY PROGRAMS

BACKGROUND

Program slicing may determine a set of program statements (e.g., individual machine instructions) that affect the correctness of a specified statement, called the slicing criterion, within a program. A slice may consist of the statements upon which the slicing criterion is dependent upon. For example, a program slice with respect to machine instruction S may include a set or subset of machine instructions upon which the instruction S is dependent for correct live-in input values. The slice may or may not pertain to instructions included in a particular code region. Such a region may include, for example, a static representation of a frequently executed code segment.

Slicing has advantages. For example, in program debugging an examination of a program slice may allow one to spend time focusing on highly relevant program statements rather than having to examine the entire program. As another example, in program parallelizing slicing helps identify independent dependence chains that can be executed in parallel.

Static slices and dynamic slices are two types of program slices. Dynamic slicing may consider each dynamic invocation of an instruction at runtime to be a different slicing criterion and therefore compute a dynamic slice set that is unique to that instruction at a specific point in the execution. In contrast, a static slice may include a single slice set for an instruction which represents all dependencies that the instruction could have.

Slices may be context-insensitive or context-sensitive. To perform context-insensitive slicing, a static backward slice with respect to a given instruction may be constructed as follows. A program dependence graph (PDG) is created based on static single assignment (SSA) data dependence information and the computed control dependence information. A backwards graph reachability analysis may then be performed on the PDG starting at the criterion instruction. However, context-insensitive slicing may ignore function calling context (e.g., return edges, call edges, and/or fallthrough pseudo edges, all of which are described below) and may provide slice sets that are too large, much larger than an equivalent context-sensitive slice. The large slice size may adversely affect automatic parallelization efforts.

Context-sensitive slicing may also be problematic. Such slicing may require computing context-sensitive slices by computing the PDG and then modifying it by adding annotations which result in a system dependence graph (SDG). A modified two-phase graph reachability analysis may then be used on the SDG to compute context-sensitive slices. However, the SDG approach may be difficult to apply to binary programs, as opposed to source code, because the approach may assume the target program is structured and that the overall program call graph and underlying parameter passing methodology is known. A structured program may be a program that has a well defined structure, such that executable statements are located within program procedures and procedures have known call and return semantics. Binary programs and binary streams often violate this assumption of structure. For example, a binary program may have overlapping procedures that cause statements to belong to more than one procedure at a time, as well as having complex control flow that may be unrelated to source-level abstractions.

FIG. 1(a) shows a sample program source code, where function "square" is called twice in statements 2 and 5. The related PDG is shown in FIG. 1(b). With context insensitive slicing, the slice for statement 3 includes 1, 2, 3, 4, 5, 7, 8 and the slice for statement 6 includes 1, 2, 4, 5, 6, 7, 8. However, statement 3 should not necessarily depend on 4 and 5 since 4 and 5 are executed after 3. Statement 6 should not necessarily depend on 1 and 2 since the values computed by 1 and 2 are rendered less relevant or irrelevant by 4 before statement 6 is reached. This example illustrates varies shortcomings of conventional slicing techniques.

BRIEF DESCRIPTION OF THE DRAWINGS

The accompanying drawings, together with the description of the invention, explain such various embodiments of the invention. In the drawings:

FIG. 4 includes pseudo code for a slicing method in one embodiment of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description. References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments. Also, as used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Figure 1:
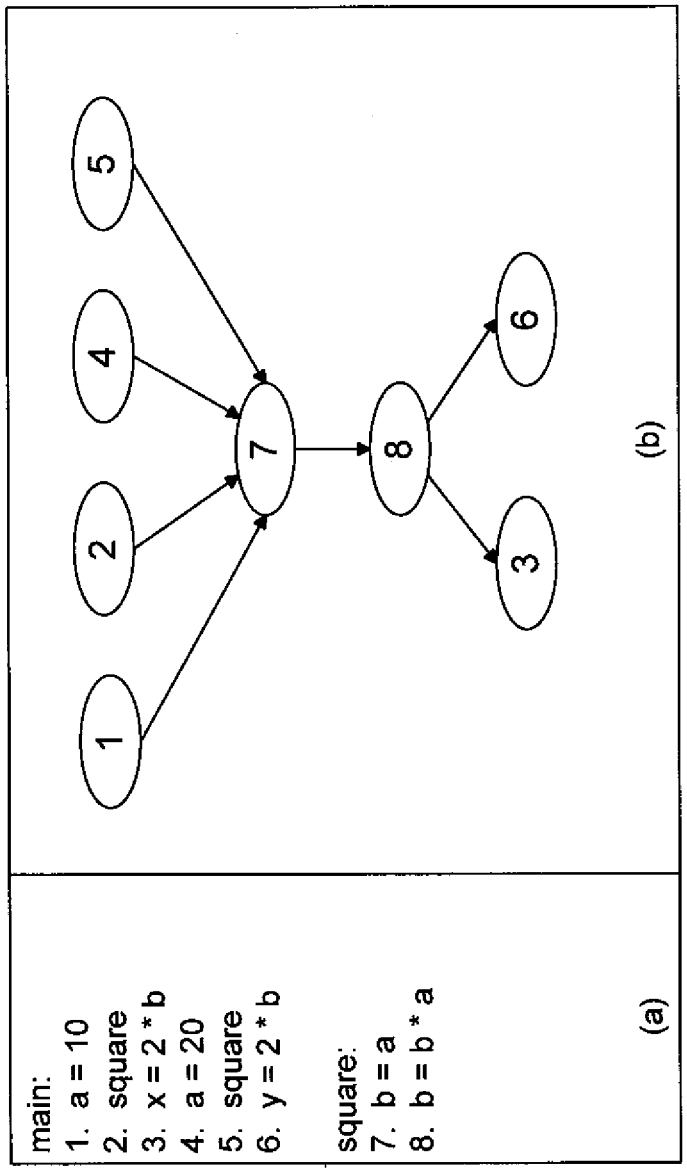
FIG. 1 is a block diagram for a conventional slicing method.

In one embodiment of the invention, a context sensitive algorithm or method can improve upon previous slicing methods. For example, FIG. 2(a) includes the same code as found in FIG. 1(a). However, unlike the context insensitive treatment of the code resulting in the slice found in FIG. 1(b), an embodiment of an improved context sensitive method may find two slices shown respectively in FIGS. 2(b) and (c). Unlike the large cumbersome single slice in FIG. 1(b), the two slices in FIGS. 2(b) and (c) can also be executed independently in parallel but with efficiency gains over conventional methods due to, for example, the reduced sizes of the slices.

Thus, embodiments of the invention include a program analysis technique that can be used to provide context-sensitive slicing of binary programs for slicing hot regions identified at runtime, with few underlying assumptions about the program from which the binary is derived. Embodiments of the invention may provide value to binary-based products that rely upon program slicing as a measure of program cohesion and parallelism. Such value may be provided for, as an example, a slicing-based parallelization infrastructure for improving automatic parallelism for sequential single-threaded performance at runtime. Furthermore, embodiments of the invention may make few or no assumptions about the structure of the evaluated program. Nor do certain embodiments require auxiliary metadata such as symbol or debug information. As such, embodiments may be applicable not only to traditional program binaries, but also to other executable sequences such as micro-operation (micro-op) traces or threads formed at runtime. Micro-op traces may include detailed low-level instructions used to implement complex machine instructions. Thus, embodiments of the invention may provide a technique that works on arbitrary binary streams and therefore brings the benefit of context-sensitive slicing to both dynamic optimization systems and virtualization frameworks.

More specifically, embodiments of the invention may include a dataflow method to traverse a program control-flow graph (CFG), as well as the introduction of fallthrough pseudo-edges to the CFG. The CFG of a program may include a graph with nodes corresponding to program statements, and edges corresponding to control flow. The PDG, discussed above, may include a graph where nodes are program statements but the edges represent both control and data dependencies between the statements. In various embodiments of the invention traversing such a CFG may allow for implicitly determining the effects of program context without requiring an explicit understanding of the program procedure structure and call-graph relationship. Greater details regarding embodiments of the invention follow.

In one embodiment of the invention, before slicing commences various assumptions may be made. For example, one assumption may be that a CFG exists for the target binary hot region. Another possible assumption is that data dependence information (e.g., use/def information) is available between nodes in the CFG as well as control dependence relations. The basis for fulfilling some or all of these assumptions may be built upon profile-derived information collected during program execution.

Preprocessing may also occur before slicing commences. In one embodiment of the invention, an initial step of a method is to preprocess the CFG and label the various edges as one of three types: calls, returns, or normal control flow. In the preprocessing phase fallthrough pseudo-edges may also be identified. The preprocessing phase may be done as the CFG is initially created. However, for clarity the phase is presented herein as a separate phase for clarity.

Figure 2:
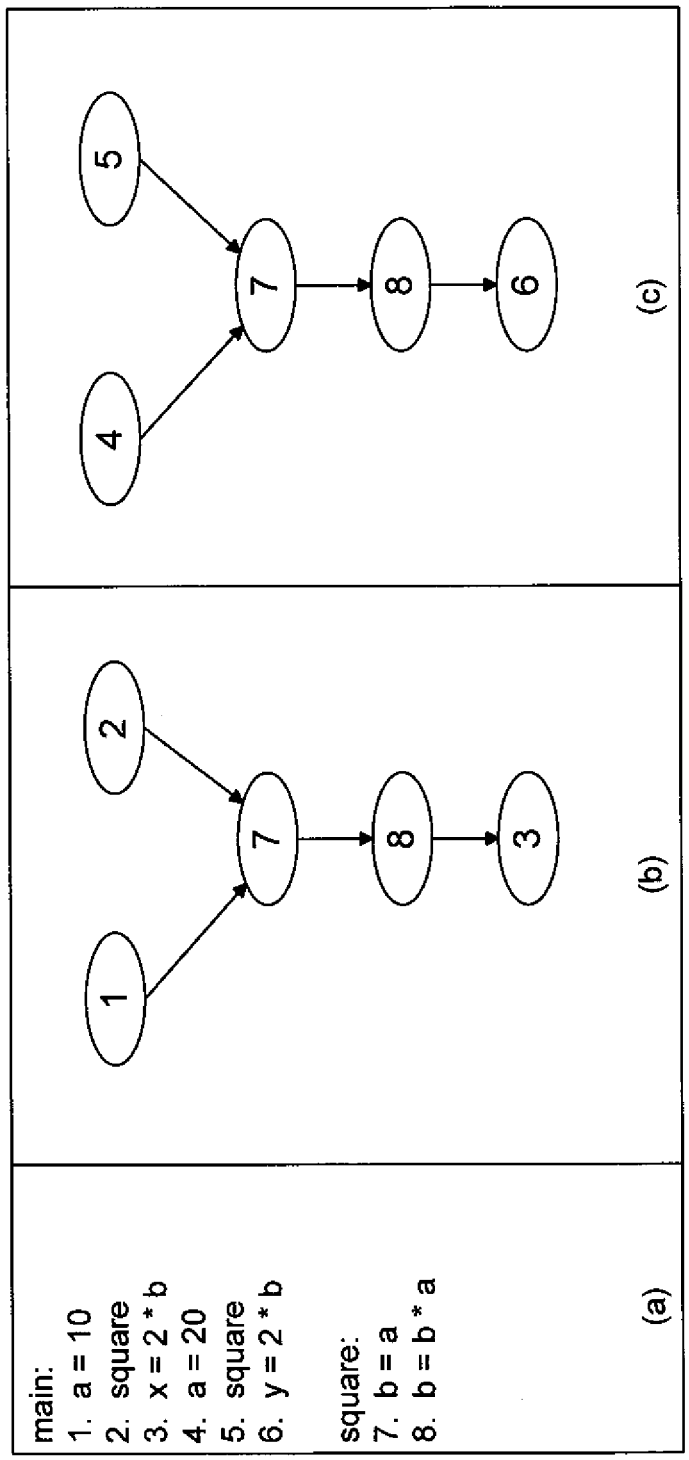
FIG. 2 is a block diagram of a slicing method in one embodiment of the invention.
Figure 3:
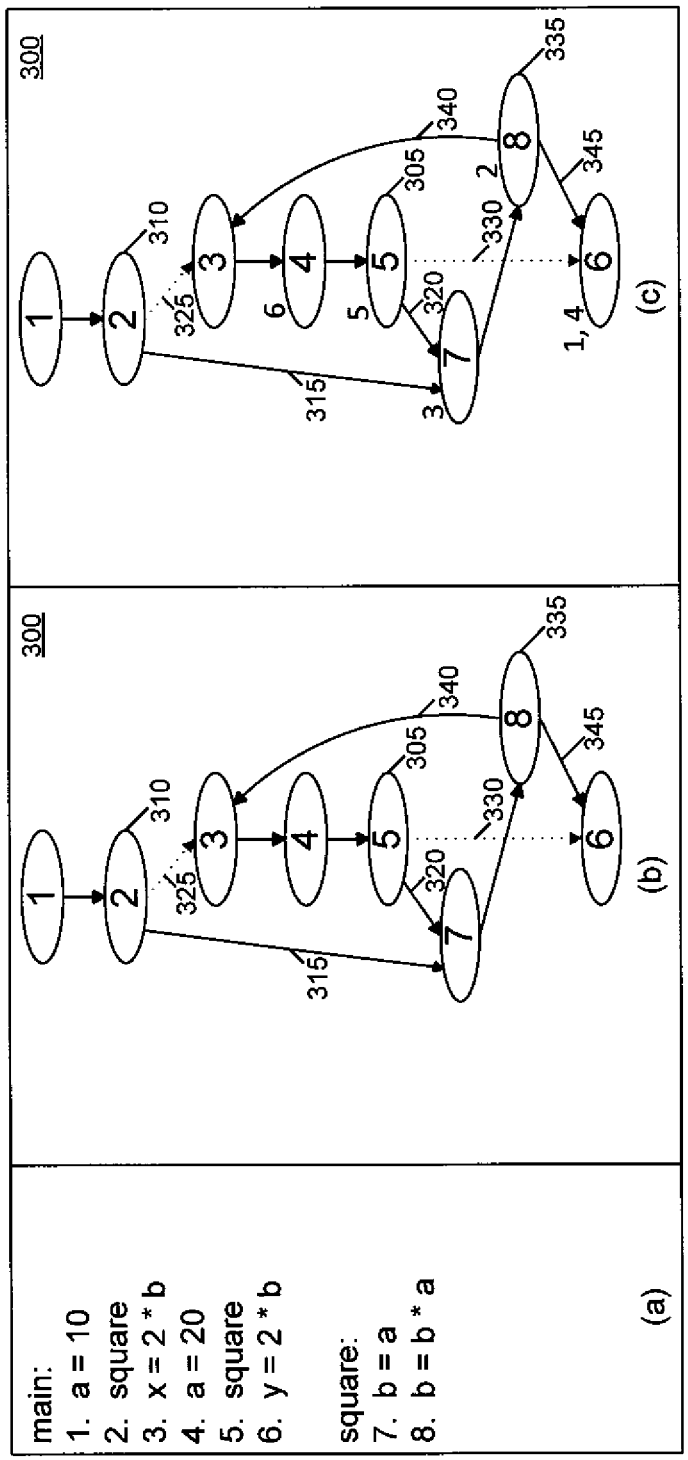
FIG. 3 is a block diagram of a slicing method in one embodiment of the invention.

The results of this preprocessing may be found in FIG. 3. FIG. 3(a) again includes the same illustrative code found in FIGS. 1(a) and 2(a). However, FIG. 3(b) includes the CFG for the sample program in FIG. 3(a) after the following preprocessing steps are performed. Specifically, preprocessing may be performed as follows in one embodiment of the invention. First, CFG is walked through to determine all nodes which represent procedure call instructions 305, 310 or equivalent actions. Possible examples of such equivalent actions may include exception invocation mechanisms, yielding to sibling co-routines, and possibly other transfers of control flow which define a new context in addition to change in control. For each of these nodes, the node's outgoing edges may be marked as call edges 315, 320 and links may be made to the node representing the instruction immediately following this instruction (in program binary order, not dynamic execution order). These links may be marked as fallthrough pseudo-edges 325, 330. A fallthrough pseudo-edge is indicative of "call instructions" returning to the proceeding instruction at some point in the future. Also, the CFG is walked through to determine some or all nodes which represent procedure return instructions 335 or equivalent actions. Examples of such equivalent actions may include a return from exception blocks, yielding to a sibling co-routine, or a transfer of control flow which is known to close a context in addition to changing the flow of control. For each of these nodes, the node's outgoing edges 340, 345 may be marked as return edges.

Given the modified CFG 300, in FIG. 3(c) an embodiment of the invention begins traversal at a desired slice criterion node (e.g., node 6) and computes a backward slice. Return edges 340, 345 in the CFG are observed. An embodiment of the method may traverse across return edges 340, 345 and initiate a recursive subslice starting at the tail instruction 6 of return edge 345. A recursive subslice may represent a portion of the overall slice that conceptually occurs in a sub-context of the program. Certain edges may be ignored during the subslice computation to provide this behavior. For example, during the computation of a recursive subslice various embodiments of the invention may ignore any encountered call edges. Certain embodiments of the method thereby do not need to use call edges to initiate recursive subslices based on metadata that maps call targets to procedure root nodes.

Embodiments of the invention may also observe the marked fallthrough pseudo-edges 330, 325. After computing subslices at return sites, the method may traverse across pseudo-edges 325, 330 and continue slicing.

Specifically, a detailed traversal of the preprocessed CFG 300 in FIG. 2(c) is now provided. The traversal is annotated with numbers indicating the traversal order of an embodiment of the backwards slicing method. To compute the backwards slice starting at node 6, the following steps may be performed, where flowIn and flowOut are the live-in and live-out sets for a given instruction node.

First, flowIn set for node 6 is set to {b} and a recursive subslice is initiated across return edge 345 starting at node 8. Second, in this recursive invocation the flowIn set for node 8 is set to {b, a}. Since node 8 defines b, node 8 is added to the slice and node 8's predecessor node 7 is added to the worklist. Third, the flowOut for node 7 is set equal to the union of the flowIn sets of its successor instructions, which in this example is only node 8 with a flowIn of {b,a}. Since node 7 defines b, which is listed in the flowOut set for node 7, it is added to the slice and it's flowIn is set to {a}. Node 7 has no predecessors (when call edges are ignored) and thus the recursive subslice computation terminates and the method returns to node 6. Fourth, now that subslice (see annotations 1-4 on nodes 6, 7, 8) has been computed, node 6 traverses across its fallthrough pseudo-edge 330 and continues slicing. This may be accomplished by adding node 5 to the worklist. Fifth, node 5 may compute its flowOut set by looking at the flowIn sets of its successor nodes, which is node 7 with a flowIn of {a}. Since node 5 does not define anything, its flowIn set is equal to its flowOut set, {a}. Node 5 is added to the slice set because its call edge into node 7 is considered a weak form of control dependence and is necessary to compute executable slices. Node 5 may add its predecessor, node 4, to the worklist. Sixth, node 4 may compute its flowOut set to be {a}, the flowIn set of node 5. Since node 4 defines {a} and does not reference any other values, its flowIn set is { }. Node 4 is added to the slice since it defines {a} which is in its flowOut set. Given that node 4 has a null flowIn set, node 4 does not add any predecessors to the worklist. Since there is nothing else in the worklist, the method terminates. Seventh, the computed slice for node 6 is: {6, 8, 7, 5, 4}, which is smaller than the slice presented in FIG. 1(b) which for node 6 is: {1, 2, 4, 5, 6, 7, 8}.

Embodiments of the invention may include a method that may be applied in a similar fashion to other nodes, such as node 3, with similar increases in efficiencies over conventional methods.

FIG. 4 includes pseudo code for a slicing method in one embodiment of the invention. Depending on the slicing starting point, an embodiment of the invention may encounter "unbalanced" returns and calls during slicing. This may happen when slicing starts lower than the highest level of a CFG, such as within a callee function, and reaches a caller function. In this case, a method may need to slice across the unbalanced call edge. In FIG. 4, the wrapper function sliceBackwards may handle such cases. For example, if a starting point for slicing is in the highest-level of a CFG, a subslice may handle context sensitive slicing for that starting point. However, if the starting point is not in the highest-level of the CFG, there may be dependence from the starting point within the callee function to its caller function (e.g., through an "unbalanced" call edge).

In one embodiment, a subslice may handle this unbalanced call edge, where from the starting point there is a call but no matching return, and put the call edge into (flowIn, calls) FIG. 4, line 1 as results of the subslice. Thus, in some embodiments a call edge may be ignored in the subslice. Then the sliceBackwards function may recursively handle the call edge by calling sliceBackwards again for (flowIn, calls). In other embodiments the subslice may generate new unresolved data dependence that need sliceBackwards to handle them. However, these unresolved dependences may belong to the slice of the current starting point. In other embodiments, a list of unresolved data dependences may be kept and sliceBackwards may be called for each unresolved data dependence without the need of recursion.

To enhance clarity, the pseudo code references a number of pre-computed sets that summarize information from the CFG. However, in embodiments of the invention the equivalent information may be queried directly from the CFG and node data structures. The following table summarizes the information contained in these sets:

TABLE 1

| | |
|---|---|
| use[n] | Provides the set of values used by instruction n. |
| def[n] | Provides the set of values defined by instruction n. |
| pred[n] | Provides the list of tuples (x, y, n) where x is a CFG predecessor of instruction n and y is the corresponding edge label: return, call, or normal. |
| succ[n] | Provides the list of tuples (x, y) where x is a CFG successor of instruction n and y is the corresponding edge label. |
| preceding[n] | Provides the instruction preceding instruction n in static program order. This is equivalent to the tail of a fallthrough pseudo-edge pointing to instruction n, and in only defined for instructions that are the target of pseudo-edges. |
| flowIn[n] | Provides the set of values live into instruction node n. |
| flowOut[n] | Provides the set of values live out of instruction node n. |

One embodiment of the invention focuses on non-recursive function calls. Recursive function calls can be detected by backward traversing a CFG (excluding call edges but including pseudo-edges) and detecting cycles containing return edges. Before the context sensitive slicing occurs, the method may add a pre-processing pass to identify each CFG with recursive calls and only perform normal context insensitive slicing thereto. Moreover, to address control-dependence in the slicing, embodiments of the invention may also transform some or all of the control dependence to data flow by adding a def to each branch instruction and uses to all instructions control-dependent on the branch instruction in the pre-processing pass.

In another embodiment of the invention, a context sensitive method can react to time constraints. For example, once a time limit is reached the method can revert to context insensitive slicing by, for example, ignoring fallthrough pseudo-edges and treating call and return edges as normal control flow edges.

Figure 5:
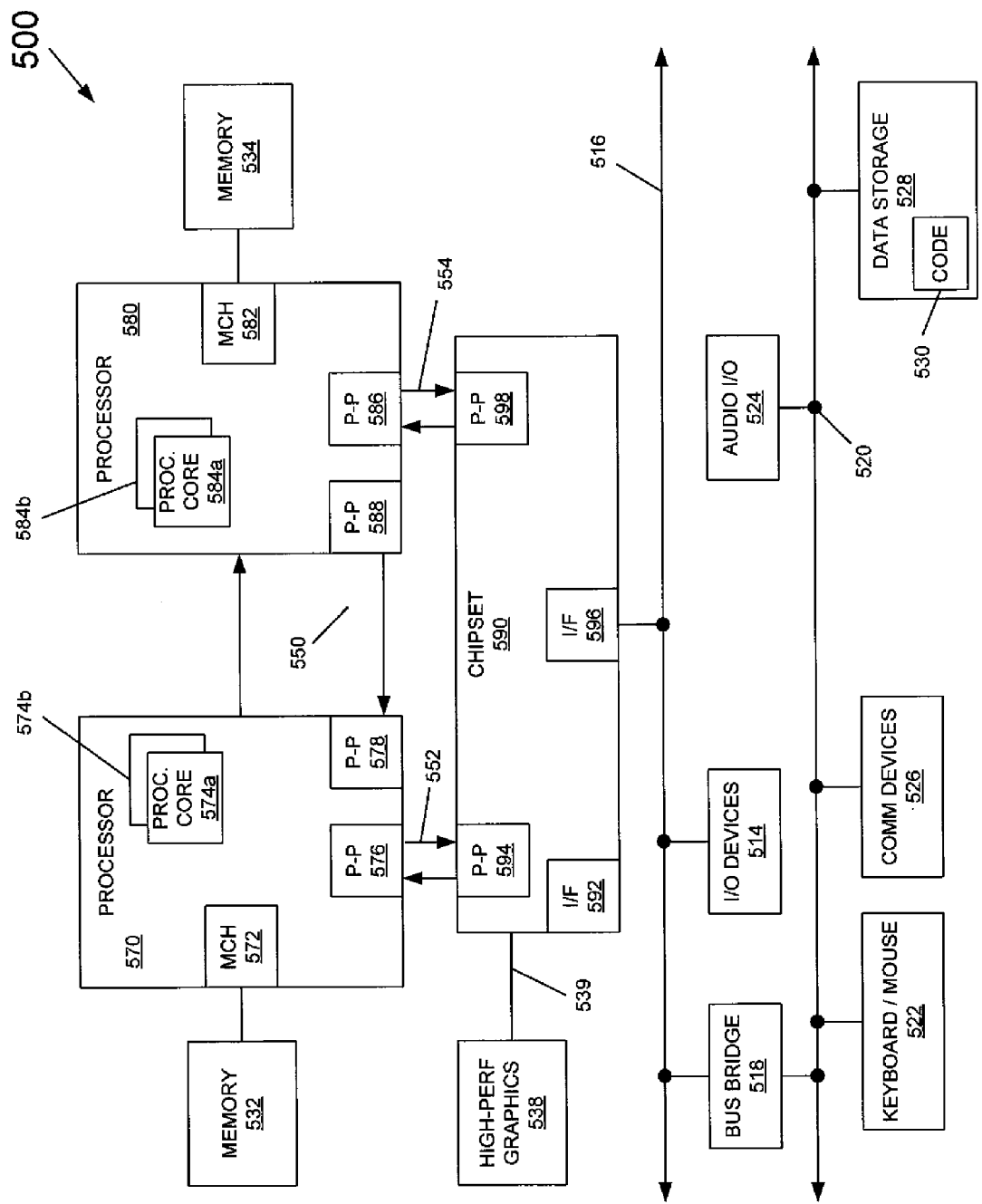
FIG. 5 is a system block diagram for use with one embodiment of the invention.

Embodiments may be implemented in many different system types. Referring now to FIG. 5, shown is a block diagram of a system in accordance with an embodiment of the present invention. Multiprocessor system 500 is a point-to-point interconnect system, and includes a first processor 570 and a second processor 580 coupled via a point-to-point interconnect 550. Each of processors 570 and 580 may be multicore processors, including first and second processor cores (i.e., processor cores 574a and 574b and processor cores 584a and 584b), although potentially many more cores may be present in the processors. The term "processor" may refer to any device or portion of a device that processes electronic data from registers and/or memory to transform that electronic data into other electronic data that may be stored in registers and/or memory.

First processor 570 further includes a memory controller hub (MCH) 572 and point-to-point (P-P) interfaces 576 and 578. Similarly, second processor 580 includes a MCH 582 and P-P interfaces 586 and 588. MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. Chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. Various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments of the invention may be described herein with reference to data such as instructions, functions, procedures, data structures, application programs, configuration settings, code, etc. When the data is accessed by a machine, the machine may respond by performing tasks, defining abstract data types, establishing low-level hardware contexts, and/or performing other operations, as described in greater detail herein. The data may be stored in volatile and/or non-volatile data storage. For purposes of this disclosure, the terms "code" or "program" cover a broad range of components and constructs, including applications, drivers, processes, routines, methods, modules, and subprograms. Thus, the terms "code" or "program" may be used to refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   processing, using a processor coupled to a memory, an unstructured binary code region that is single-threaded;
   determining a slice criterion for the region;
   determining a call edge, a return edge, and a fallthrough pseudo-edge for the region based on analysis of the region at a binary level;
   traversing the fallthrough pseudo-edge, which immediately follows, in binary order, a call instruction corresponding to the call edge;
   generating a context-sensitive code slice based on the call edge, the return edge, the fallthrough pseudo-edge, and the slice criterion; and
   saving the context-sensitive code slice in the memory.

2. The method of claim 1 including generating the context-sensitive code slice by traversing the return edge.

3. The method of claim 2 including determining a recursive subslice for the region based on the return edge and ignoring one of the call edge and another call edge.

4. The method of claim 3, wherein the determination of the recursive subslice is not based on metadata for the another call edge.

5. The method of claim 3 including traversing the fallthrough pseudo-edge after determining the recursive subslice.

6. The method of claim 1 including:
   determining a recursive function call; and
   generating a context-insensitive code slice for the recursive function call but not attempting to generate a context-sensitive code slice for the recursive function call.

7. The method of claim 1 including generating, based on a time limit expiration, a context-insensitive code slice for a second call edge by treating the second call edge as a normal control flow edge.

8. The method of claim 6 including generating the context-insensitive code slice by treating another return edge included in the region as a normal control flow edge and ignoring another fallthrough pseudo-edge included in the region.

9. The method of claim 1 including parallelizing the region, based on the context-sensitive code slice, to determine first and second threads from the single-threaded region; wherein the first and second threads may be executed in parallel.

10. The method of claim 1 including generating the context-sensitive code slice at runtime.

11. The method of claim 10, wherein the region is a hot region.

12. The method of claim 10 including determining the call edge, the return edge, and the fallthrough pseudo-edge based on a control flow graph for the region.

13. The method of claim 1, wherein the region is completely included in a micro-operation thread formed at runtime.

14. The method of claim 1, wherein the determination of the slice is not based on metadata that includes debug information.

15. An article comprising a medium storing instructions that enable a processor-based system to:
   process, using a processor of the system, an unstructured binary code region that is single-threaded;
   determine a return edge, a call edge, and a fallthrough pseudo-edge for the region based on analysis of the region at a binary level;
   traverse the fallthrough pseudo-edge, which immediately follows, in binary order, a call instruction corresponding to the call edge;
   generate a context-sensitive code slice based on the return edge, the call edge, and the fallthrough pseudo-edge; and
   store, in a memory of the system, the context-sensitive code slice.

16. The article of claim 15, further storing instructions that enable the processor based-system to:
   generate the slice by traversing the return edge; and
   generate, based on a time limit, a context-insensitive slice by treating another call edge included in the region as a normal control flow edge.

17. An apparatus comprising:
   at least one memory to receive an unstructured binary code region that is single-threaded;
   a processor, coupled to the at least one memory, configured to:
   determine a return edge, a call edge, and a fallthrough pseudo-edge for the region based on analysis of the region at a binary level;
   traverse the fallthrough pseudo-edge, which immediately follows, in binary order, a call instruction corresponding to the call edge;
   generate a context-sensitive code slice based on the return edge, the call edge, and the fallthrough pseudo-edge; and
   save the context-sensitive code slice in the at least one memory.

18. The apparatus of claim 17, wherein the processor is configured to:
   determine another call edge for the region based on analysis of the region at the binary level; and
   generate the slice based on the another call edge.

19. The apparatus of claim 17, wherein the processor is configured to generate, based on a time limit, a context-insensitive code slice by treating another call edge included in the region as a normal control flow edge.

* * * * *